United States Patent
Oh et al.

(10) Patent No.: US 7,299,515 B2
(45) Date of Patent: Nov. 27, 2007

(54) WASHING MACHINE CONTROL METHOD

(75) Inventors: Soo Young Oh, Seoul (KR); Jin Woong Kim, Gwangmyeong-si (KR); Hyun Seok Seo, Incheon-si (KR); Tae Hee Lee, Seoul (KR); Joon Woo Kim, Gwangmyeong-si (KR); Kyung Chul Woo, Seoul (KR)

(73) Assignee: LG Electronics, Inc., Seoul (KR)

( * ) Notice: Subject to any disclaimer, the term of this patent is extended or adjusted under 35 U.S.C. 154(b) by 708 days.

(21) Appl. No.: 10/729,986

(22) Filed: Dec. 9, 2003

(65) Prior Publication Data

US 2004/0144135 A1    Jul. 29, 2004

(30) Foreign Application Priority Data

Dec. 10, 2002    (KR)    .................. 10-2002-0078289

(51) Int. Cl.
*D06F 35/00* (2006.01)
(52) U.S. Cl. .................. 8/158; 12/12.02; 12/12.04
(58) Field of Classification Search ............. 68/12.04, 68/23.16, 23.1, 12.02; 8/158, 159
See application file for complete search history.

(56) References Cited

U.S. PATENT DOCUMENTS

| | | | |
|---|---|---|---|
| 4,857,814 A | | 8/1989 | Duncan |
| 5,092,140 A | * | 3/1992 | Matsuo et al. ............. 68/12.04 |
| 5,208,931 A | * | 5/1993 | Williams et al. ............... 8/159 |
| 5,341,452 A | | 8/1994 | Ensor |
| 5,507,054 A | | 4/1996 | Blauert et al. |

(Continued)

FOREIGN PATENT DOCUMENTS

EP    0 704 568 A1    4/1996

(Continued)

*Primary Examiner*—Michael Barr
*Assistant Examiner*—Jason Heckert
(74) *Attorney, Agent, or Firm*—Birch, Stewart, Kolasch & Birch, LLP

(57) ABSTRACT

A washing machine control method accurately determines an amount of laundry in the washing machine, while driving a motor coupled to a drum under load, based on a computed average of pulse width modulation values at the time of stopping the drive of a motor and the motor's rotational angle as the motor freewheels to a stop, in order to conserve water and reduce the time required for performing a washing step. The method includes steps accelerating a motor to a target rotational speed, by periodically applying to the motor a pulse width modulation (PWM) signal having a predetermined duty ratio; storing in a memory a set of PWM values corresponding to the signal applied in the accelerating step, by sensing a rotational speed of the motor; outputting a PWM signal having a duty ratio of zero, after the sensed motor speed reaches the target rotational speed, to allow the motor to freewheel to a stop; computing an average of the stored PWM values; measuring a rotational angle of the motor as the motor freewheels to a stop; calculating a laundry amount estimation value based on the average of the stored PWM values and the motor's rotational angle; and determining a laundry amount by comparing the calculated laundry amount estimation value to a set of laundry amount reference values stored in a lookup table. The laundry amount estimation value equals $w_1 PWM_{ave} + w_2 \theta_{motor}$, where $PWM_{ave}$ is the computed average of the stored PWM values, $\theta_{motor}$ is the measured rotational angle, and $w_1$, and $w_2$ are weight constants.

8 Claims, 3 Drawing Sheets

U.S. PATENT DOCUMENTS 6,460,381 B1 * 10/2002 Yoshida et al. ............ 68/12.04
2002/0029428 A1   3/2002 Weinmann

FOREIGN PATENT DOCUMENTS

| EP | 1 201 811 A2 | 5/2002 |
| GB | 2 247 250 A | 2/1992 |
| GB | 2 325 245 A | 11/1998 |
| JP | 05-003990 * | 1/1993 |
| KR | 1999-0075775 A | 10/1999 |

* cited by examiner

WASHING MACHINE CONTROL METHOD

This application claims the benefit of Korean Application No. 10-2002-0078289 filed on Dec. 10, 2002, which is hereby incorporated by reference.

BACKGROUND OF THE INVENTION

1. Field of the Invention

The present invention relates to washing machines, and more particularly, to a washing machine control method, in which an amount of laundry in the washing machine is determined based on a computed average of pulse width modulation values at the time of stopping the drive of a motor and the motor's rotational angle as the motor freewheels to a stop.

2. Discussion of the Related Art

Generally speaking, a washing machine is an apparatus for washing laundry by performing washing, rinsing, and dewatering steps in accordance with a wash course as selected by a user Washing machines are typically categorized according to washing type is and may include pulsator, agitator, and drum types.

To perform washing using a washing machine in which laundry has been placed, a wash course is selected to determine a wash pattern, water is supplied to the washing machine according a predetermined water level based on a sensed amount of laundry in the washing machine, and washing is performed based on the predetermined water level. After the water reaches the predetermined level, however, a motor is driven to perform washing. In doing so, the laundry absorbs a portion of the water, and the water level is lowered such that water should be re-supplied until reaching the desired level. Accordingly, it is difficult to accurately sense the amount of laundry in the washing machine.

A general drum-type washing machine, as shown in FIG. 1, is comprised of a tub 2 for holding washing water and a drum 3 for holding laundry, rotatably installed in the tub and receiving a drive force of a motor 4 via a belt 5 and pulleys 41 and 31 to perform washing related steps. With laundry placed inside the drum 3, the tub 2 is filled with water to a predetermined level. Under such a load, the motor 4 is driven under the control of a microcomputer (not shown), to proceed the washing, rinsing, and dewatering steps. Once a washing step is initiated, water is supplied to the tub 2 to a predetermined level, and the motor 4 is driven to rotate the drum 3 forward and reversely so that the laundry is evenly soaked in the water, whereupon the laundry partially absorbs the water so that the water level drops below the predetermined level.

The microcomputer of the above washing machine detects the water level to determine whether a water re-supply operation is needed. That is, if the water level has dropped below the predetermined level, it is determined that a water re-supply operation is needed, in which case the rotation (drive) of the drum 3 is stopped while water is re-supplied to the predetermined level, after which the rotation of the drum 3 begins anew. The microcomputer repeats the above steps until a predetermined time expires, while counting the number of the water re-supply operations, to determine the amount of laundry based on the counted number of the water re-supply operations during the predetermined time. To accomplish this, the microcomputer is provided with a lookup table for storing a set of reference values, which are preset for a given washing machine, to determine the laundry amount as being one of a predetermined set of laundry loads, e.g., a small, medium, or large laundry load. The reference values can be known since a larger laundry load absorbs more water and results in a greater number of water re-supply operations; conversely, fewer water re-supply operations would indicate smaller laundry loads.

After the desired water supply level is reached through a number of water re-supply operations, the washing step is executed based on a laundry amount determined by the above process. In such a method, however, the time for the water supply to reach the desired level is excessive, which unnecessary prolongs the washing step and tends to waste water. Moreover, a determination of the laundry amount using a lookup table is inherently inaccurate.

SUMMARY OF THE INVENTION

Accordingly, the present invention is directed to a washing machine control method that substantially obviates one or more of the problems due to limitations and disadvantages of the related art.

An object of the present invention, which has been devised to solve the foregoing problem, lies in providing a washing machine control method, which conserves water and reduces the time required for performing a washing step, by accurately sensing a laundry amount prior to executing the washing step.

It is another object of the present invention to provide a washing machine control method by which an accurate laundry amount can be determined.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a washing machine control method comprising steps of accelerating a motor to a target rotational speed, by periodically applying to the motor a pulse width modulation (PWM) signal having a predetermined duty ratio; storing in a memory a set of PWM values corresponding to the signal applied in said accelerating step, by sensing a rotational speed of the motor; outputting a PWM signal having a duty ratio of zero, after the sensed motor speed reaches the target rotational speed, to allow the motor to freewheel to a stop; computing an average of the stored PWM values; measuring a rotational angle of the motor as the motor freewheels to a stop; and calculating a laundry amount estimation value based on the average of the stored PWM values and the motor's rotational angle. Preferably, the method further comprises a step of determining a laundry amount by comparing the calculated laundry amount estimation value to a set of laundry amount reference values stored in a lookup table.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations where possible.

Figure 1:
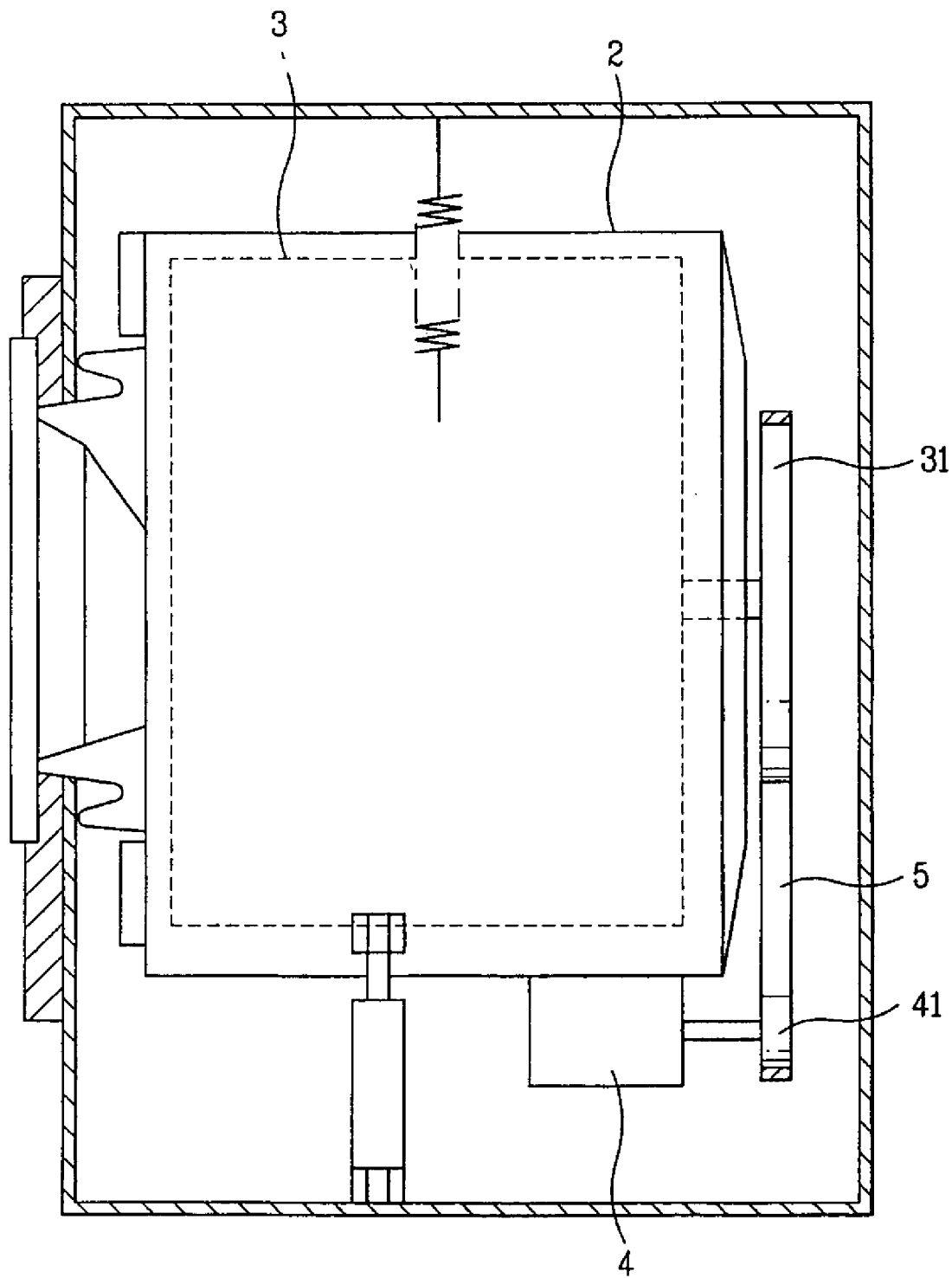
FIG. 1 is a cross-sectional view of a general drum-type washing machine.
Figure 2:
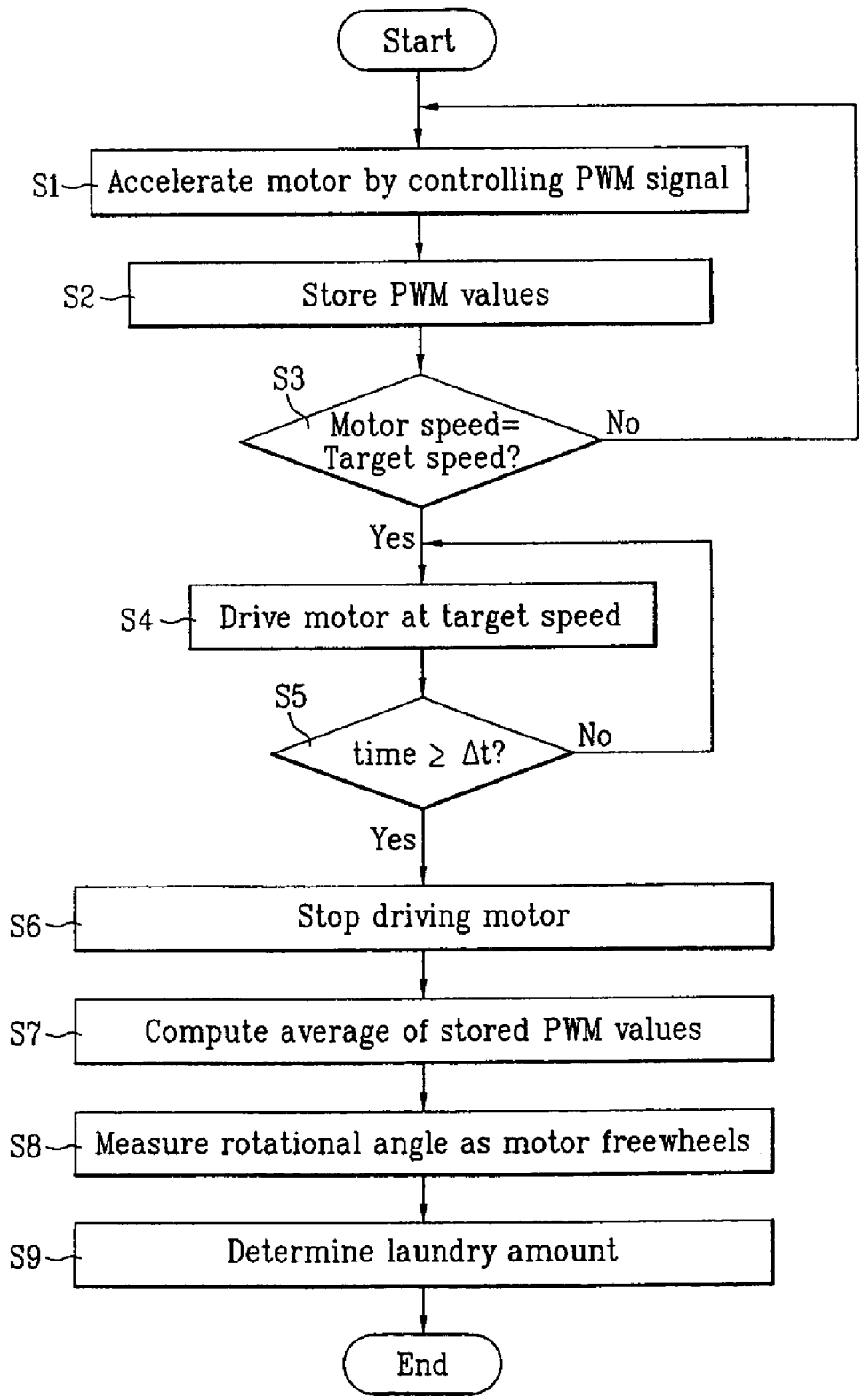
FIG. 2 is a flowchart of a washing machine control method according to the present invention.
Figure 3:
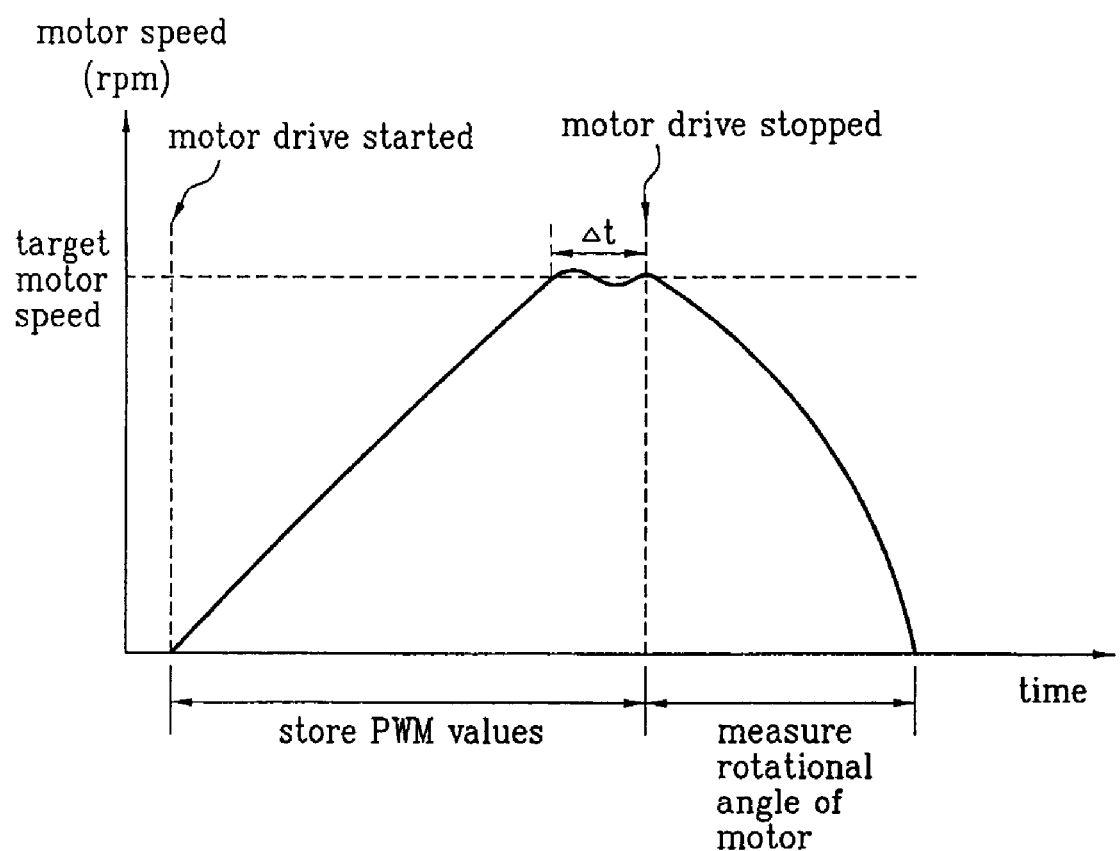
FIG. 3 is a graph of motor speed over time, for explaining washing machine control method according to the present invention.

FIG. 2 illustrates a washing machine control method according to the present invention, which is adopted by the general washing machine shown in FIG. 1. The graph of FIG. 3 plots motor speed (rpm) over time, as a motor of a drum-type washing machine adopting the method of the present invention is driven under the control of a microcomputer.

Referring to FIG. 2, with laundry placed in a drum and a washing step initiated after selecting a wash cycle, the microcomputer of the washing machine outputs a motor drive signal for driving a motor, to rotate the drum by a rotational torque of the motor (S1). The motor drive signal is a pulse width modulation (PWM) signal, which is controlled to have a is predetermined duty ratio. As the motor accelerates, the microcomputer periodically, for example, at a 4 ms rate, senses the motor speed and compares the sensed speed to a target speed to determine a set of values corresponding to the PWM signal based on a detected speed differential. The PWM values, which are the applied duty ratios of the controlled PWM signal, are stored (S2) in a memory of the microcomputer for later computation.

The above acceleration and storage of corresponding PWM values continues until the motor speed reaches a target rotational speed measured in revolutions per minute (rpm). Once the rotational speed of the motor reaches the target speed (S3), the microcomputer controls the PWM value so that the rotational speed of the motor is held steady over a predetermined time Δt (S4 and S5), during which time the microcomputer continues to store the applied PWM values, which remain substantially constant in correspondence to the target speed. Thus, the stored PWM values are all the values resulting from the PWM signal applied to the motor, from a motor drive initiating point to the time of discontinuing the drive of the motor.

Upon expiration of the predetermined time Δt, the drive of the motor is stopped (S6), but its rotation continues (freewheels) by inertia. At the time of stopping the motor drive, i.e., upon output a motor drive signal having a duty ratio of zero, the microcomputer computes (S7) an average of the stored PWM values, i.e., the values stored since initiation of the washing step. Meanwhile, the microcomputer measures (S8) a rotational angle of the motor as freewheeling continues and the motor slows to a stop, i.e., rpm=0. The laundry amount is determined (S9), using a calculated laundry amount estimation, based on the computed average of the PWM values at the time of stopping the motor's drive and the rotational angle of the motor as the motor freewheels, which are characteristic operational properties of a given washing machine's motor. The ultimately determined laundry amount is reached based on a relation between an assumed laundry amount, set according to the selected wash cycle, and a set of laundry amount reference values determined for a given model of washing machine through a repeated testing of a sample of the washing machine and stored in a lookup table of a microcomputer's memory.

The estimated laundry amount ($A_{est}$) is calculated as $A_{est} = w_1 PWM_{ave} + w_2 \theta_{motor}$, where $PWM_{ave}$ is the computed average of the stored PWM values, $\theta_{motor}$ is the motor's rotational angle, and $w_1$ and $w_2$ are weight constants arbitrarily assigned by the manufacturer according to the washing machine model. The weight constants are values resulting in a specific value, e.g., zero, of the laundry amount estimation when the laundry amount sensing procedure is performed by driving the drum-type washing machine without a load.

The present invention enables an accurate determination of the laundry amount, using the average of the PWM values during acceleration and then the freewheeling rotational angle, since the operational properties of a driven motor are proportional to a load amount. That is, since a small amount of laundry applies a small load to the motor, the resulting PWM value is correspondingly small, while a large amount of laundry applies a large load to the motor, so that the resulting PWM value is correspondingly large. In other words, the size of the laundry load directly determines a frictional force existing between the motor and the drum holding the laundry, and the required duty ratio of the PWM signal applied to the motor for a given acceleration increases in direct proportion to the laundry load.

Meanwhile, the freewheeling rotational angle is similarly proportional to the size of the laundry load, i.e., laundry amount, since the magnitude of an inertial force acting on the motor corresponds to the laundry amount. That is, the inertial force is in direct proportion to the amount of laundry.

By estimating the laundry amount using the PWM value applied to the motor and the motor's freewheeling rotational angle, the method of the present invention enables the generation of an accurate laundry amount value through an iteration of the laundry amount estimation and the laundry amount assumed at the time of initiating the wash step. Therefore, a washing machine adopting the present invention can more accurately determine the laundry amount, so that a water supply level and a washing time can be appropriately set, thus conserving water and reducing the time required for performing a washing step.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A washing machine control method comprising steps of:

accelerating a motor to a target rotational speed, by periodically applying to the motor a pulse width modulation (PWM) signal having a predetermined duty ratio;

storing in a memory a set of PWM values corresponding to the signal applied in said accelerating step, by sensing a rotational speed of the motor;

outputting a PWM signal having a duty ratio of zero, after the sensed motor speed reaches the target rotational speed, to allow the motor to freewheel to a stop;

computing an average of the stored PWM values;

measuring a rotational angle of the motor as the motor freewheels to a stop; and calculating a laundry amount estimation value based on the average of the stored PWM values and the motor's rotational angle.

2. The method as claimed in claim 1, further comprising a step of determining a laundry amount by comparing the calculated laundry amount estimation value to a set of laundry amount reference values stored in a lookup table.

3. The method as claimed in claim 1, wherein the laundry amount estimation value equals $w_1 PWM_{ave} + w_2 \theta_{motor}$, where $PWM_{ave}$ is the computed average of the stored PWM values, $\theta_{motor}$ is the measured rotational angle, and $w_1$ and $w_2$ are weight constants.

4. The method as claimed in claim 3, wherein the weight constants $w_1$ and $w_2$ are arbitrarily set to render the laundry amount estimation as a specific value when the motor is driven without a load.

5. The method as claimed in claim 1, wherein the stored PWM values of said average computing step are the PWM values corresponding to the PWM signal applied to the motor, from a motor drive initiating point to the time of discontinuing the drive of the motor.

6. The method as claimed in claim 1, wherein the motor is driven at a constant speed corresponding to the target rotational speed for a predetermined time before said outputting step.

7. The method as claimed in claim 6, wherein the stored PWM values of said average computing step are the PWM values corresponding to the PWM signal applied to the motor, from a motor drive initiating point to the time of discontinuing the drive of the motor.

8. The method as claimed in claim 1, wherein the PWM value is applied to the motor according to a 4 ms cycle.

* * * * *